Sept. 23, 1924.                              1,509,215
                    H. SLATER
                    TRICYCLE
        Filed April 19, 1923      2 Sheets-Sheet 1
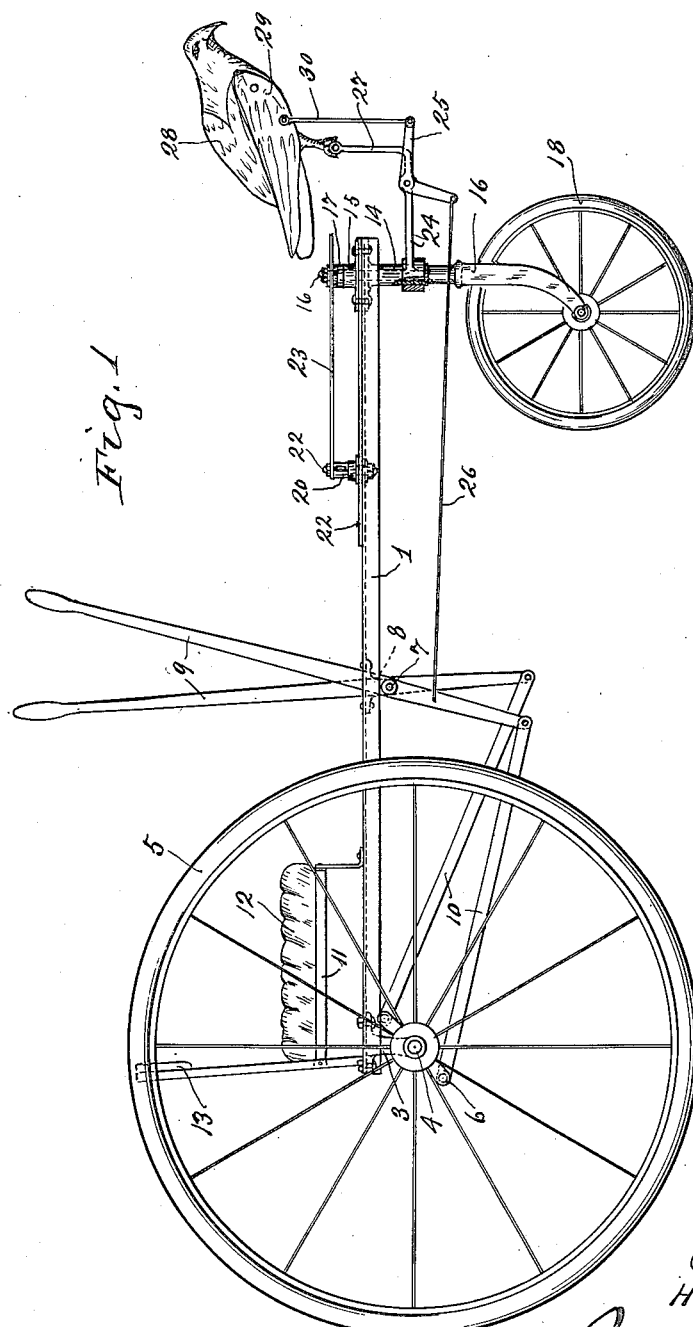
Inventor.
Harry Slater.
By his Attorney
James F. Williamson

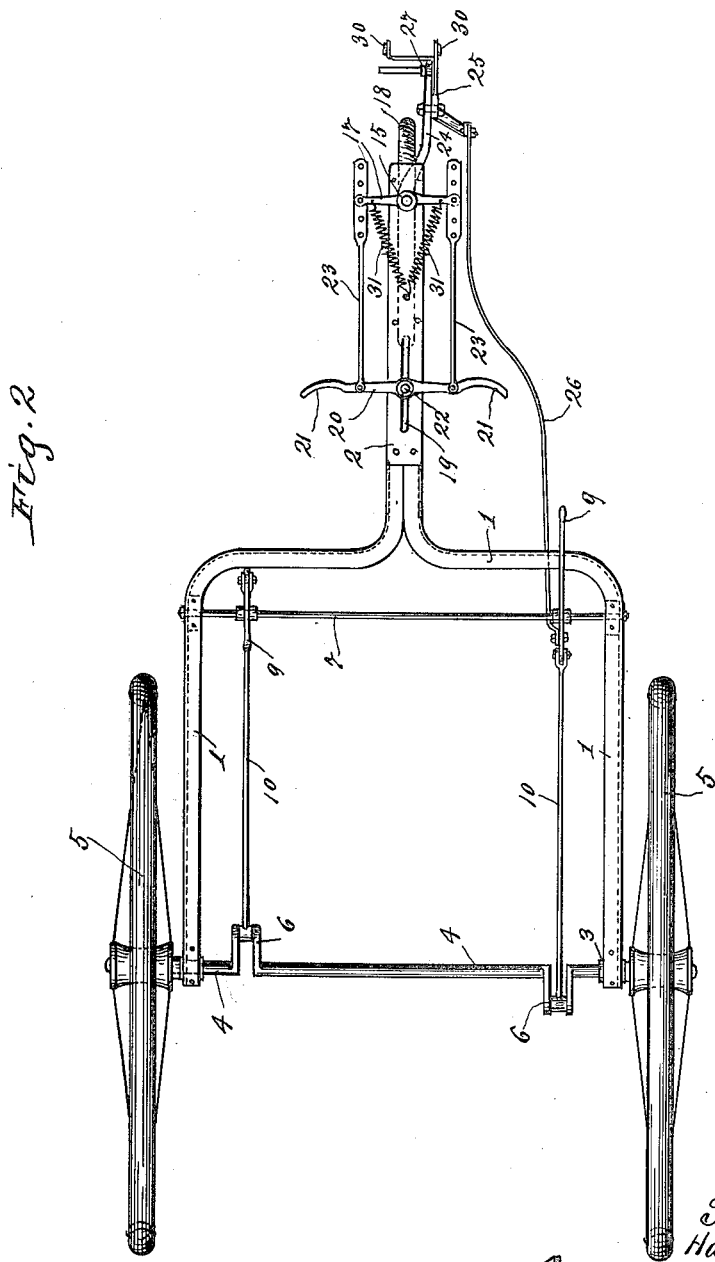

Patented Sept. 23, 1924.

1,509,215

UNITED STATES PATENT OFFICE.

HARRY SLATER, OF HAWTHORNE, CALIFORNIA.

TRICYCLE.

Application filed April 19, 1923. Serial No. 633,122.

*To all whom it may concern:*

Be it known that I, HARRY SLATER, a citizen of the United States, residing at Hawthorne, in the county of Los Angeles and State of California, have invented certain new and useful Improvements in Tricycles; and I do hereby declare the following to be a full, clear, and exact description of the invention, such as will enable others skilled in the art to which it appertains to make and use the same.

This invention relates to a vehicle and particularly to a type of vehicle adapted to be propelled by hand and which may be used by invalids or may be adapted as a toy for young people.

It is an object of this invention to provide a vehicle having supporting and driving wheels arranged to be manually operated by the person occupying the vehicle seat and to have a steering wheel adapted to be operated by the feet of the person occupying said seat.

It is a further object of the invention to provide such a vehicle having resilient means tending to hold the steering wheel in position for a straight course and to provide the hand operating means in the form of hand levers.

It is a further object of the invention to provide such a vehicle adapted for a play or toy vehicle having an artificial bird or other creature at the front thereof which is given motion from the moving parts of the vehicle.

These and other objects and advantages of the invention will be fully set forth in the following description made in connection with the accompanying drawings in which like reference characters refer to the same parts throughout the different views, and in which, Fig. 1 is a view in side elevation of the vehicle; and Fig. 2 is a plan view thereof.

Referring to the drawings, the vehicle comprises a frame which, in the embodiment of the invention illustrated, is shown as made from spaced angle bars 1 extending parallel to each other and being provided with substantially right angle bends so that they are brought substantially together at the forward portion of the frame where they are surmounted and have secured thereto by bolts or rivets a plate 2. The rear end of the members 1 have bolted to the undersides thereof depending brackets 3 forming the bearings for the axle member 4 to the outer ends of which are secured in any suitable or customary manner the supporting wheels 5. The axle 4 between the members 1 is formed as a crank shaft having thereon crank portions 6. A shaft 7 extends transversely of the frame members 1 slightly forward of the wheels 5 and is oscillatably mounted in bearings 8 depending from and secured to the members 1. A pair of hand levers 9 are secured to the shaft 7 and have their handle-equipped portions projecting upwardly a considerable distance above the frame members 1. The lower ends of the levers 9 extend some distance below the shaft 7 and these ends are connected by links 10 to the respective crank portions 6 of the axle 4. A seat frame 11 is secured to the members 1 between the wheels 5 and is illustrated as having thereon a cushion 12 and the cushioned back frame or rest 13.

The forward portion of the frame has a bearing member 14 bolted or riveted thereto and to the plate 2 which member, as clearly shown in Fig. 1, has a depending hub, and another bearing member 15 is secured by the same fastenings above plate 2 and has a hub alined with the hub of the bearing 14. A wheel fork 16 is provided having an upper shouldered cylindrical portion journaled in the bearings 15 and 14. The shouldered portion thereof contacts with the lower end of the bearing 14. Said fork has secured to the upper end of its portion which extends through the bearings 14 and 15, a transverse bar 17 so that the fork is securely held against endwise movement. A wheel 18 is mounted in the fork 16 and supports the front end of the frame. The plate 2 and the forward portion of the members 1 have a slot 19 extending longitudinally thereof and a transverse bar 20 having formed at each end thereof a pedal portion 21, is oscillatably mounted on a headed and nutted bolt or stud 22 which is adjustably secured in the slot 19 and extends therethrough. The bar 20 is pivotally connected just inside of the pedal portions 21 to links 23 extending forward thereof and provided with a plurality of spaced holes through any one of which they are adapted to be pivotally connected to the ends of the bar 17. The bar 17 has connected thereto adjacent its opposite ends a pair of coiled tensile springs 31 extending rearward from said bar and connected to a common point substantially centrally of the plate 2.

The bearing 14 has a bracket 24 secured thereto and extending forward therefrom beyond the front end of the members 1 and this bracket has pivotally secured thereto a bell crank lever 25, the forward and substantially horizontal arm of which is formed as a fork and the other arm of which projects substantially vertically and is pivotally connected by a link 26 to the lower portion of one of the levers 9. The bracket 24 has an arm 27 extending vertically on which is mounted an artificial creature such as a bird 28 provided with movable and oscillatable wing portions 29, which wing portions are pivotally connected by links 30 to the ends of the fork portion 25 of the bell crank lever.

In operation, the rider will occupy the seat of the vehicle and the pedal bar 20 will be adjusted together with the links 23 so that the feet of the rider can conveniently be placed against the pedals 21. The rider can now drive the wheels 5 and progress the vehicle by grasping and oscillating the levers 9 which will drive the wheels through the crank shaft axle. The vehicle can be steered by the operator pushing on one or the other of the pedals 21 and thus through the bar 17 turning the fork 16 and wheel 18 to one side or the other. The wheel 18 will be held in a plane parallel to the longitudinal axis of the frame or in said plane by the springs 31 so that the vehicle will normally move in a straight line. As the vehicle is progressed the motion of the lever 9 and the bell crank 25 will cause the bird or eagle 28 to flap its wings, thus greatly adding to the enjoyment of the vehicle for children.

From the above description it is seen that applicant has provided an extremely simple and efficient vehicle and one which can be very easily propelled and steered. The vehicle, as stated, is capable of being adapted for use of invalids and is particularly adapted to be constructed as a play vehicle for children. The parts of the vehicle are few and easily made and assembled and the vehicle is at the same time very strong and durable.

It will, of course, be understood that various changes may be made in the form, details and arrangement of the parts without departing from the scope of applicant's invention, which, generally stated, consists in the matter shown and described and set forth in the appended claims.

What is claimed is:

1. A vehicle comprising a frame, a pair of wheels supporting the same at the rear thereof, a crank shaft mounted in said frame and forming an axle on which said wheels are mounted, a seat secured to said frame adjacent the rear thereof, a shaft extending transversely of said frame forward of said seat, hand levers mounted on said shaft having handle portions extending above the frame and portions extending below the frame, connections from the lower end of said levers to said crank shaft for turning the same and said wheels, a bracket at the front of said frame, a figure having pivoted wings supported on said bracket, a bell crank lever fulcrumed on said bracket, links connected at one end to one arm of said lever and at their other ends to said wings, and a link connected at one end to the other arm of said lever and at its other end to one of said handles whereby said wings will be flapped when said vehicle is propelled.

2. A vehicle comprising a frame, a pair of wheels supporting the same adjacent the rear thereof, means for propelling said wheels, a wheel supporting bearing at the front end of said frame, supporting means extending forward from said bearing, a figure of a bird mounted on said last mentioned means above the frame having movable wings, and means connected to said wings and to said propelling means for causing motion of said wings when the vehicle is operated.

In testimony whereof I affix my signature.

HARRY SLATER.